US011487930B2

(12) United States Patent
Gao et al.

(10) Patent No.: US 11,487,930 B2
(45) Date of Patent: Nov. 1, 2022

(54) PATTERN MATCHING USING ANCHORS DURING INTEGRATED CIRCUIT VERIFICATION

(71) Applicant: Synopsys, Inc., Mountain View, CA (US)

(72) Inventors: Chen Gao, Shanghai (CN); Yuli Xue, Shanghai (CN); Tony Tan, Shanghai (CN); Weiping Fang, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 25 days.

(21) Appl. No.: 17/085,727

(22) Filed: Oct. 30, 2020

(65) Prior Publication Data

US 2021/0133383 A1 May 6, 2021

(30) Foreign Application Priority Data

Oct. 30, 2019 (CN) .......................... 201911042661.X

(51) Int. Cl.
*G06F 30/00* (2020.01)
*G06F 30/398* (2020.01)
*G06F 30/392* (2020.01)
*G06F 119/12* (2020.01)

(52) U.S. Cl.
CPC .......... *G06F 30/398* (2020.01); *G06F 30/392* (2020.01); *G06F 2119/12* (2020.01)

(58) Field of Classification Search
CPC ... G06F 30/398; G06F 30/392; G06F 2119/12
See application file for complete search history.

(56) References Cited

U.S. PATENT DOCUMENTS

| 7,861,196 | B2 * | 12/2010 | Huckabay | ............... | G06F 30/39 |
| | | | | | 716/122 |
| 8,718,382 | B2 * | 5/2014 | Fang | ......................... | G06K 9/68 |
| | | | | | 382/217 |
| 9,171,126 | B1 * | 10/2015 | Salazar | ..................... | G03F 1/44 |
| 10,684,544 | B2 * | 6/2020 | Choi | ....................... | G03F 7/705 |

FOREIGN PATENT DOCUMENTS

JP 2010085461 A * 4/2010

\* cited by examiner

*Primary Examiner* — Naum Levin
(74) *Attorney, Agent, or Firm* — Sterne, Kessler, Goldstein & Fox P.L.L.C.

(57) ABSTRACT

Pattern matching using anchors during integrated circuit (IC) verification is disclosed. According to one embodiment, a method includes obtaining match time estimates associated with pattern anchors of different anchor types for an IC pattern, generating revised match time estimates based on a target IC layout, and then selecting the pattern anchor associated with the shortest revised match time estimate. Then, target anchors of the same anchor type as the selected pattern anchor are generated for the target IC layout, and the target IC layout is searched for the IC pattern using the selected pattern anchor and the target anchors.

20 Claims, 7 Drawing Sheets

| Anchor Type | Dimension Parameters | Example IC Pattern with Candidate Anchors |
|---|---|---|
| Vertex | N/A |  |
| 90° Concave Vertex | N/A |  |
| Rectangle Shape | Length and width ranges |  |
| Enclosing | Enclosing range |  |
| Convex Vertex | N/A |  |
| Line end shape | End-edge length range |  |
| Non-rectangle Shape | Bounding Box length and width ranges |  |
| 45° vertex | N/A |  |
| 45° concave vertex | N/A |  |

IC Pattern Q 202

PATTERN MATCHING USING ANCHORS DURING INTEGRATED CIRCUIT VERIFICATION

CROSS-REFERENCE TO RELATED APPLICATIONS

This application claims priority under 35 U.S.C. § 119(a) to Chinese Application No. 2019 1 1042661, filed on Oct. 30, 2019, and is incorporated by reference herein in its entirety.

TECHNICAL FIELD

The present disclosure relates generally to integrated circuit (IC) verification. In particular, the present disclosure relates to pattern matching using anchors during IC verification.

BACKGROUND

Pattern matching is used to find hotspots or waive good patterns from error reports in IC verification. However, pattern matching can take many days and consume large amounts of memory for a full chip verification. Accordingly, a faster and/or less memory intensive approach to pattern matching during IC verification would be beneficial.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

In the drawings, like reference numbers generally indicate identical or similar elements. Additionally, generally, the left-most digit(s) of a reference number identifies the drawing in which the reference number first appears.

DETAILED DESCRIPTION

Aspects of the present disclosure relate to performing pattern matching using anchors during integrated circuit (IC) verification. An IC pattern may be associated with multiple pattern anchors (e.g., reference points) and different pattern anchors may belong to different anchor types. Match time estimates are calculated for the pattern anchors based on multiple factors including the target IC layout. The pattern anchor with the shortest match time estimate is used to search the target IC layout for regions matching the IC pattern. This searching may include generating target anchors for the target IC layout belonging to the same anchor type as the pattern anchor with the shortest match time estimate. This technique may reduce IC verification run time and/or memory usage.

Figure 1:
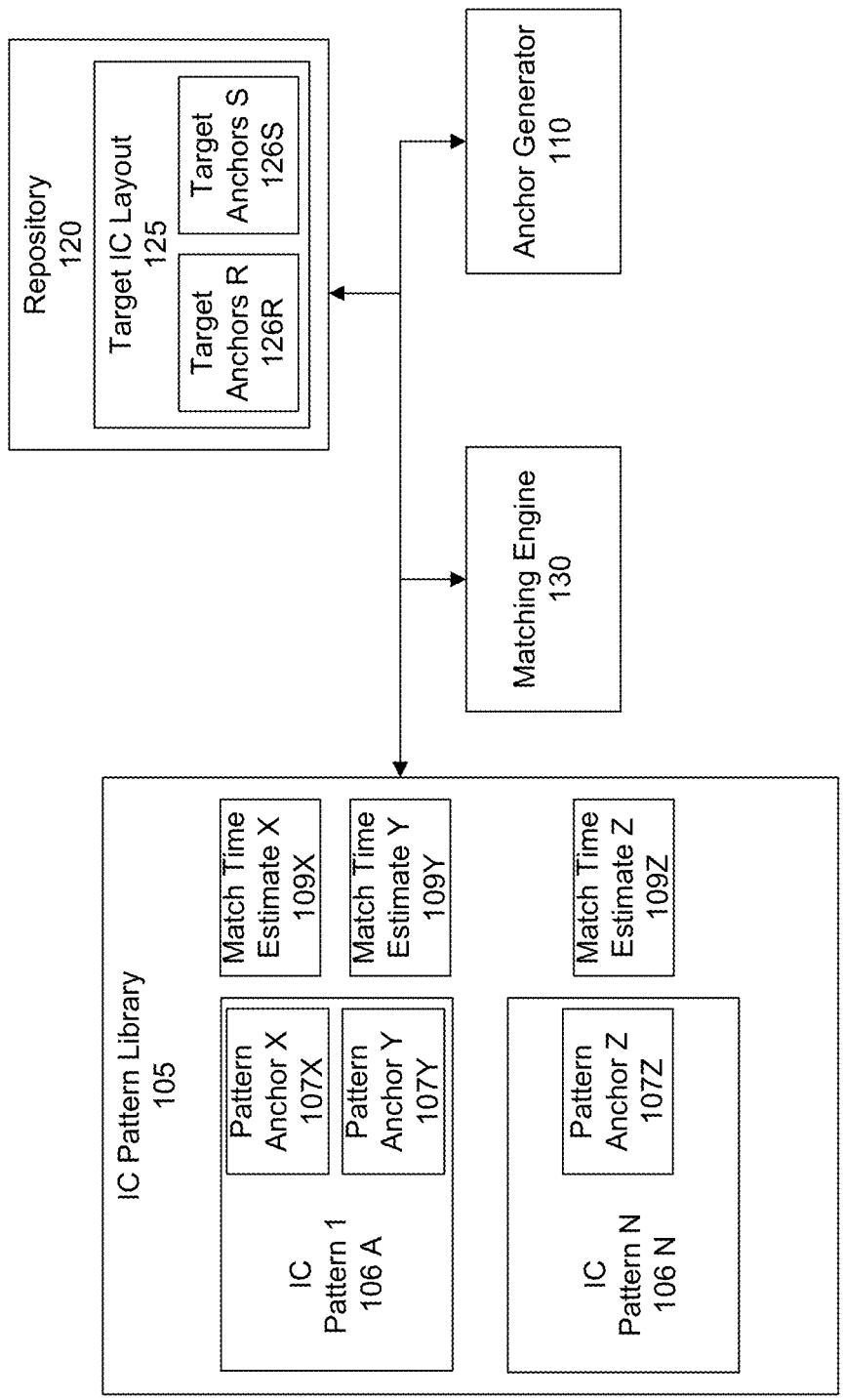
FIG. 1 depicts an IC validator in accordance with one or more embodiments.

FIG. 1 depicts IC validator 100 in accordance with one or more embodiments. As shown in FIG. 1, IC validator 100 has multiple components including IC pattern library 105, anchor generator 110, repository 120, and matching engine 130. Each of these components may be implemented in any combination of hardware and software. Additionally or alternatively, each of these components may execute on one or more computing devices (e.g., server, mainframe, personal computer (PC), laptop computer, tablet PC, smartphone, etc.) connected by a network having wired and/or wireless segments. Two or more of the components may execute on the same computing device.

As shown in FIG. 1, the repository 120 stores target IC layout 125. Target IC layout 125 includes the representation of one or more ICs in terms of planar geometric shapes which correspond to the patterns of metal, oxide, or semiconductor layers that make up the components of the ICs. Target IC layout 125 may have one or more layers. In one or more embodiments, IC validator 100 is used to verify target IC layout 125. In other words, IC validator 100 may be used to ensure target IC layout 125 has correct electrical and logical functionality and/or manufacturability.

IC pattern library 105 stores multiple IC patterns (e.g., IC pattern 1 106A, IC pattern N 106N). One or more IC patterns 106A to 106N may correspond to undesirable patterns (e.g., patterns in which one or more constraints are not satisfied, such as manufacturing constraints, design rule check (DRC) constraints, electrical constraints, lithographic constraints, etc.). Accordingly, if target IC layout 125 includes one or more instances of IC patterns 106A to 106N, these matching regions of target IC layout 125 may be reported as hotspots in a verification report for further evaluation and possible correction or redesign.

Additionally or alternatively, one or more IC patterns 106A to 106N may correspond to an acceptable pattern. Accordingly, if a verification report identifies hotspots in target IC layout 125 that match one or more IC patterns 106A to 106N, these hotspots in the verification report may be waived (i.e., the regions of target IC layout 125 identified as hotspots in the verification report may be deemed as actually satisfying the one or more constraints and thus not requiring correction or redesign).

In one or more embodiments, each IC pattern 106A to 106N is associated with one or more pattern anchors. For example, IC pattern 1 106A is associated with pattern anchor X 107X and pattern anchor Y 107Y. As another example, IC pattern N 106N is associated with pattern anchor Z 107Z. Each of the pattern anchors 107X to 107Z belongs to an anchor type and each of the pattern anchors 107X to 107Z may be selected from candidate anchors (discussed below). An IC pattern may have multiple layers. In such scenarios, each layer may be associated with one or more pattern anchors, and each pattern anchor for a layer belongs to a different anchor type.

In one or more embodiments, target IC layout 125 is associated with multiple sets of target anchors (e.g., target anchors R 126R, target anchors S 126S). Different sets of target anchors belong to different anchor types. For example, target anchors R 126R all belong to one anchor type, while target anchors S 126S belong to a different anchor type.

Moreover, these target anchors 126R, 126S may belong to the same anchor types as pattern anchors 106A to 106N. For example, pattern anchor X 107X and target anchors R 126R may belong to the same anchor type, while pattern anchor Y 107Y and target anchors S 126S may belong to the same anchor type.

In one or more embodiments, the pattern anchors 107X to 107Z and target anchors 126R, 126S are used to find instances of IC patterns 106A to 106N in target IC layout 125 (i.e., find one or more areas in target IC layout 125 that match the IC patterns 106A to 106N) (discussed below). The pattern anchors 107X to 107Z and the target anchors 126R, 126S act as reference points within the IC patterns and the target IC layout 125, respectively.

In one or more embodiments, each pattern anchor 107X to 107Z for an IC pattern 106A to 106N is also associated with a match time estimate (e.g., match time estimate X 109X, match time estimate Y 109Y, match time estimate Z 109 Z). Each match time estimate 109X to 109Z is the estimated time for finding, in any target IC layout, instances of the corresponding IC pattern 106A to 106N using the pattern anchor. For example, match time estimate X 109X is the estimated time for finding, in any target IC layout, instances of IC pattern 1 106A using pattern anchor X 107X. As another example, match time estimate Y 109Y is the estimated time for finding, in any target IC layout, instances of IC pattern A 106A using pattern anchor Y 107Y. Match time estimates 109X to 109Z are not dependent on target IC layout 125. Instead, match time estimates 109X to 109Z for a pattern anchor and IC pattern depend on the anchor type of the pattern anchor, the time to generate the candidate anchors of the anchor type for the IC pattern, the number of candidate anchors, and the average time per match.

Figure 2:
FIG. 2 depicts a table of anchor types in accordance with one or more embodiments.
Figure 2:
Figure 2:
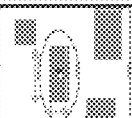
Figure 2:
Figure 2:
Figure 2:
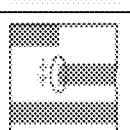
Figure 2:
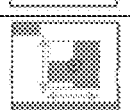
Figure 2:
Figure 2:
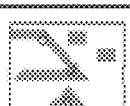

FIG. 2 depicts a table listing multiple (e.g. nine) anchor types that may be generated for an IC pattern (or target IC layout): vertex, 90° concave vertex, rectangle shape, enclosing, convex vertex, line end shape, non-rectangle shape, 45° vertex, and 45° concave vertex. For example, anchor X 107X and anchor Z 107Z may be of the vertex anchor type, while anchor Y 107Y may be of the 90° concave vertex anchor type. For each anchor type, the table in FIG. 2 also includes an example IC pattern and candidate anchors of the anchor type generated for the example IC pattern.

Candidate anchors may be generated for all vertices in the IC pattern. These candidate anchors all belong to the vertex anchor type. Candidate anchors may be generated for all 90° concave vertices in the IC pattern. These candidate anchors all belong to the 90° concave vertex anchor type. Candidate anchors may be generated for all convex vertices in the IC pattern. These candidate anchors all belong to the convex vertex anchor type. Candidate anchors may be generated for all 45° vertices in the IC pattern. These candidate anchors belong to the 45° vertex anchor type. Candidate anchors may be generated for all 45° concave vertices. These candidate anchors belong to the 45° concave vertex anchor type.

Some of the anchor types (e.g., rectangle shape, enclosing, line end shape, non-rectangle shape) are associated with one or more dimension parameters. These dimension parameters further regulate generation of the candidate anchors for an IC pattern.

For example, candidate anchors may be generated for all rectangular shapes in the IC pattern so long as the length and width of the rectangular shape fall within a length range and a width range, respectively. The candidate anchor may be placed at the center of the rectangular shape. These candidate anchors belong to the rectangle shape anchor type and the dimension parameters specify the length range and the width range.

As another example, candidate anchors may be generated for all non-rectangular shapes in the IC pattern so long as the length and width of the bounding box (BB) enclosing the non-rectangular shape fall within a BB length range and a BB width range, respectively. The candidate anchor may be placed at the center of the BB. These candidate anchors belong to the non-rectangle shape anchor type and the dimension parameters specify the BB length range and the BB width range.

As yet another example, a candidate anchor may be generated for the end-edge of a line element so long as the length of the end-edge falls within a length range. The candidate anchor may be placed at the mid-point of the end-edge. These candidate anchors belong to the line end shape anchor type and the dimension parameter specifies the length range.

As discussed above, an IC pattern has one or more layers (e.g., layer D, layer E, layer F, etc.). For a given anchor type, it might be possible to generate candidate anchors for each layer. For example, it might be possible to generate candidate anchors of the vertex anchor type for layer D, layer E, layer F, etc. However, for other anchor types, it might only be possible to generate candidate anchors for some of the layers. For example, it might only be possible to generate candidate anchors of the 45° concave vertex anchor type for layer E, but not for layer D (i.e., layer D might not have the necessary geometry for candidate anchors of the 45° concave vertex anchor type).

A candidate anchor may be generated for the end-edge of a line if it has a parallel same direction end-edge in another layer (and there is no other edge in-between these 2 edges) within an enclosing range. The candidate anchor may be placed at the mid-point of the end-edge. These candidate anchors belong to the enclosing anchor type and the dimension parameter specifies the enclosing range.

For some anchor types (e.g., line end shape), only one candidate anchor may be generated for a layer of the IC pattern. For other anchor types (e.g., vertex), there may be many candidate anchors generated for a layer of the IC pattern. Moreover, for a single layer of an IC pattern, there may be many generated candidate anchors of a first anchor type but only a few (or even zero) generated candidate anchors of a second anchor type, a third anchor type, etc. For example, in FIG. 2, IC pattern Q 202 has 7 candidate anchors of the vertex anchor type, 2 candidate anchors of the 90° concave vertex anchor type, and zero candidate anchors of the 45° vertex anchor type. Furthermore, although nine anchor types are listed in FIG. 2, other anchor types may also be used in conjunction with the present disclosure.

Referring back to FIG. 1, if there are nine anchor types (as shown in FIG. 2), it is possible for a single layer of an IC pattern 106A to 106N to have one or more candidate anchors of each anchor type. Accordingly, it is possible for a single layer of an IC pattern to be associated with nine pattern anchors (i.e., one pattern anchor selected from the candidate anchors of each anchor type), and each of those nine pattern anchors associated with a match time estimate. However, it is also possible for a single layer of an IC pattern to have candidate anchors for only a subset of the nine anchor types (e.g., one or two anchor types). In such scenarios, the single layer IC pattern is associated with less than nine pattern anchors.

Similarly, for some target IC layouts, it may be possible to generate target anchors 126R, 126S for all nine anchor types. However, for other target IC layouts, it might only be possible to generate target anchors 126R, 126S for a subset of the nine anchor types.

In one or more embodiments, anchor generator 110 is configured to generate candidate anchors of different anchor types for the one or more layers of IC patterns 106A to 106N, select a pattern anchor 107X to 107Z of each anchor type from among the candidate anchors, and calculate the match time estimates 109X to 109Z for the pattern anchors 107X to 107Z. This is discussed below in reference to FIG. 3.

In one or more embodiments, anchor generator 110 is configured to generate target anchors of different anchor types for target IC layout 125. Further, anchor generator 110 may be configured to estimate the number of target anchors of a given anchor type for target IC layout 125 (discussed below) without actually generating the target anchors. The algorithm(s) that estimate the number of target anchors execute faster than the algorithms that actually generate the target anchors for a given anchor type with target IC layout 125. This is discussed below in reference to FIG. 4.

In one or more embodiments, matching engine 130 is configured to search target IC layout 125 for one or more areas that match one of the IC patterns 106A to 106N. The searching may include aligning a pattern anchor of the pattern IC with a target anchor (of the same anchor type) for target IC layout 125, clipping the target IC layout 125 around the target anchor based on a size of the pattern IC, and then comparing the region surrounding the pattern anchor in the IC pattern with the region surrounding the target anchor in the clipped portion of the target IC layout 125 for a match. The searching is discussed below in reference to FIG. 4 and FIG. 5.

Figure 3:
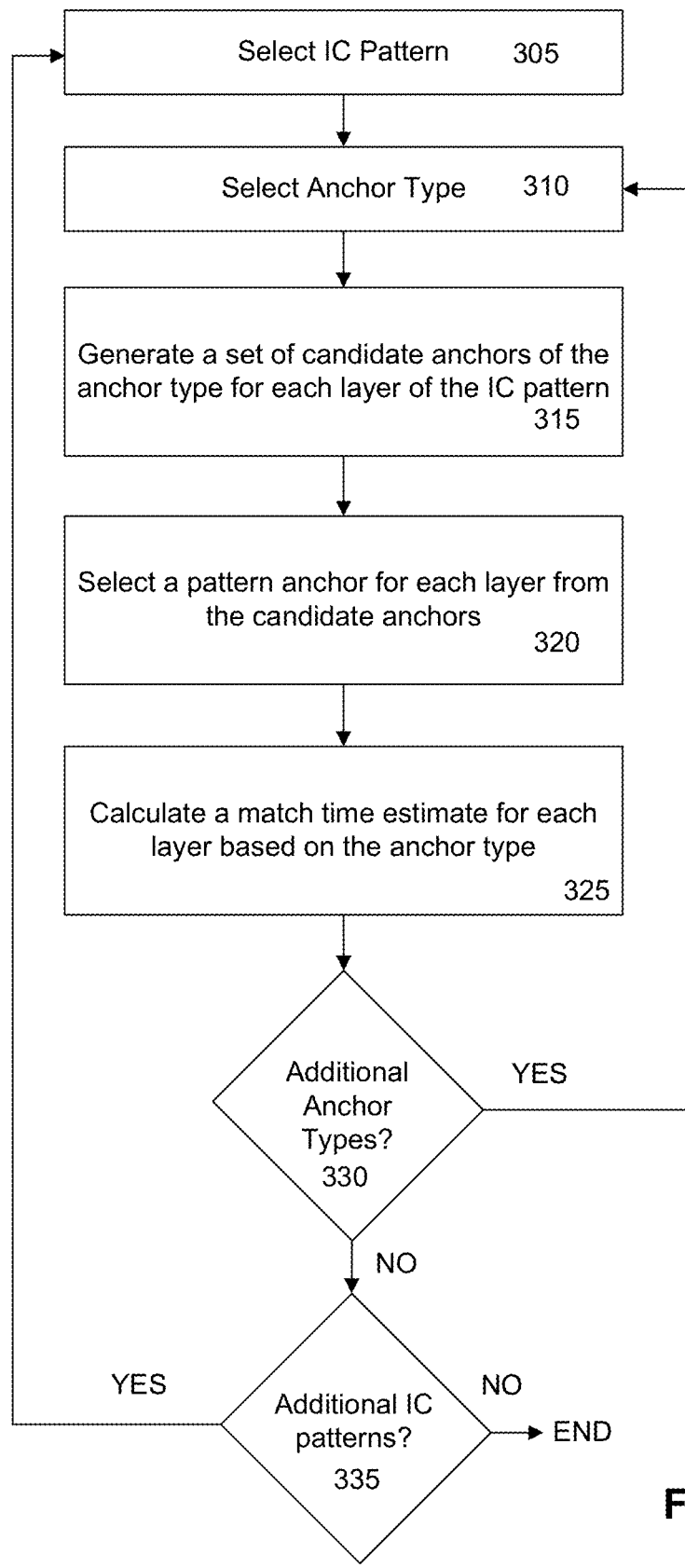
FIG. 3 and FIG. 4 depict flowcharts for IC pattern matching using anchors in accordance with one or more embodiments.

FIG. 3 depicts a flowchart for IC pattern matching using anchors in accordance with one or more embodiments. In one or more embodiments, one or more of the steps depicted in FIG. 3 may be omitted, repeated, and/or performed in a different order than the order depicted in FIG. 3. Accordingly, the scope of the present method should not be considered limited to the specific arrangement of steps depicted in FIG. 3.

The method depicted in FIG. 3 shall be described with reference to FIG. 1 and FIG. 2. However, the method is not limited to those example embodiments.

At 305, an IC pattern is selected. The IC pattern may be selected by anchor generator 110. The IC pattern may be selected at random from among the IC patterns 106A to 106N stored in IC pattern library 105 that have not yet been selected. Alternatively, the IC patterns 106A to 106N stored in IC pattern library 105 may be ranked (e.g., based on size, complexity, etc.) and the IC patterns 106A to 106N are selected according to their rank (e.g., highest ranked IC pattern is selected first, lowest ranked IC pattern is selected first, etc.). The selected IC pattern may have one or more layers. Each layer may be of a specific type (e.g., metal, via, gate, oxide, etc.)

At 310, an anchor type is selected. As discussed above in reference to FIG. 2, there are multiple anchor types including vertex, 90° concave vertex, rectangle shape, etc. The anchor type may be selected by anchor generator 110. An anchor type may be selected at random from among the anchor types that have not yet been selected for the IC pattern. Alternatively, the anchor types may be ranked and the anchor types are selected according to their rank (e.g., highest ranked anchor type is selected first, lowest ranked anchor type is selected first, etc.).

At 315, a set of candidate anchors of the selected anchor type is generated for each layer of the selected IC pattern. The set of candidate anchors may be generated by anchor generator 110. If the selected anchor type has one or more dimension parameters, candidate anchor generation is regulated by the dimension parameters (discussed above in reference to FIG. 2). For some anchor types (e.g., vertex), there may be multiple candidate anchors generated for a layer of the selected IC pattern. For other anchor types, (e.g., non-rectangle shape), there might only be one candidate anchor generated for a layer of the selected IC pattern. Moreover, for some anchor types, there might be zero candidate anchors generated for a layer of the IC pattern. If every layer in the IC pattern has zero candidate anchors of the selected anchor type, the process may proceed directly to 330.

At 320, one of the candidate anchors in a layer of the IC pattern is selected as the pattern anchor for the layer of the IC pattern. If the IC pattern has multiple layers, this may be performed for each layer. The pattern anchor for the IC pattern may be selected by anchor generator 110. The pattern anchor for a layer of the IC pattern may be selected at random from the set of candidate anchors in the layer. Alternatively, the candidate anchor closest to the center of the layer of the IC pattern (e.g., having the shortest distance to the center of the layer of the IC pattern) may be selected as the pattern anchor of the layer of the IC pattern.

At 325, a match time estimate associated with the selected anchor type is calculated for each layer in the IC pattern is calculated. The match time estimate may be calculated by anchor generator 110. In one or more embodiments, the match time estimate is calculated without considering the target IC layout 125. The match time estimate T(type, i) may be calculated as T(type, i)=A+B*C, where i is the layer of the IC pattern, type is the selected anchor type, A is an estimated anchor generation time (i.e., the estimated time to generate the set of candidate anchors at 315), B is the number of candidate anchors of the selected anchor type in layer i, and C is the estimated average match time for each match (e.g., the time to clip a target IC layout around a target anchor of the selected anchor type and compare the clipped portion of the target IC layout with the IC pattern). For example, if the selected anchor type (from 310) is vertex and the IC circuit has three layers (D, E, F), T(vertex, D), T(vertex, E), and T(vertex, F) are calculated at 325.

In one or more embodiments, A is an approximation based on historical run times (e.g., CPU cycles) for generating anchors of the selected anchor type. In one or more embodiments, C is an approximation based on historical average match times for anchors of the selected anchor type. One or more of the variables may be tuned by a user. In one or more embodiments, historical run time data exists for each anchor type. A and/or C may be tuned such that the order of the match time estimates for different anchor types follow the order of actual historical run times for the different anchor types.

At 330, it is determined whether there exists at least one anchor type that has not yet been selected for the IC pattern. When it is determined that at least one such anchor type exists, the process returns to 310. When it is determined that all anchor types have been selected for the IC pattern, the process proceeds to 335.

At 335, it is determined whether there exists at least one IC pattern in IC pattern library 105 that has not yet been selected. When it is determined one such IC pattern exists, the process returns to 305. When it is determined that all IC patterns have been selected, the process may end.

Those skilled in the art, having the benefit of this detailed description, will appreciate that following the execution of the process shown in FIG. 3, each IC pattern layer is associated with one or more pattern anchors. If a single layer of an IC pattern is associated with multiple pattern anchors, each of the multiple pattern anchors belongs to a different anchor type. Moreover, each pattern anchor of a layer of an IC pattern is associated with a match time estimate. Accordingly, the value T(type, i) may exist for all anchor types and all layers of the IC pattern.

Those skilled in the art, having the benefit of this detailed description, will also appreciate that if an IC pattern, its one or more pattern anchors, and the associated match time estimates are provided in advance (e.g., by a third-party), the IC pattern may skip the process depicted in FIG. 3. Moreover, the process shown in FIG. 3 may be performed without knowledge of target IC layout 125.

Figure 4:
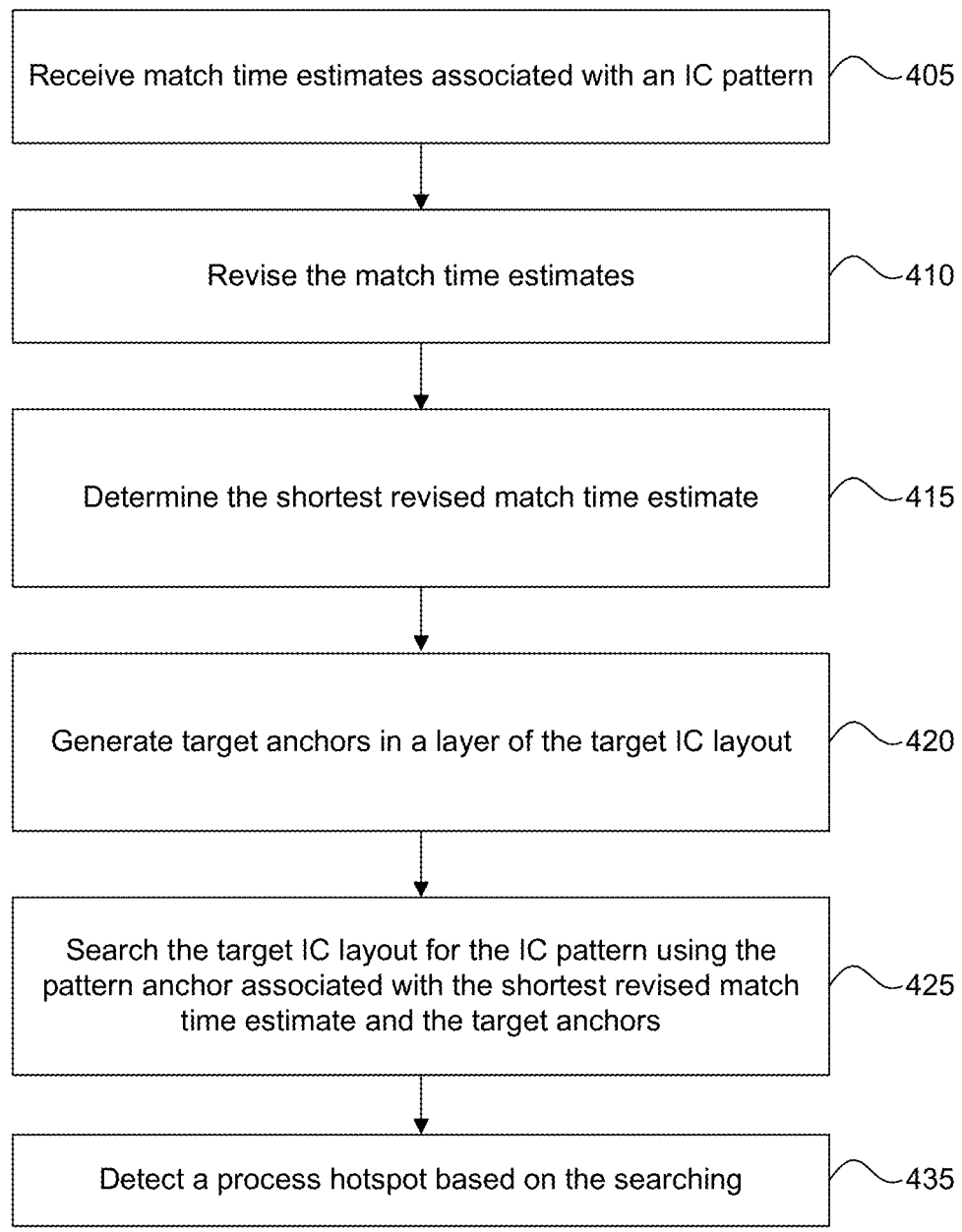

FIG. 4 depicts a flowchart for IC pattern matching using anchors in accordance with one or more embodiments. In one or more embodiments, one or more of the steps depicted in FIG. 4 may be omitted, repeated, and/or performed in a different order than the order depicted in FIG. 4. Accordingly, the scope of the present method should not be considered limited to the specific arrangement of steps depicted in FIG. 4. In one or more embodiments, the method depicted in FIG. 4 is executed after the method depicted in FIG. 3.

The method depicted in FIG. 4 shall be described with reference to FIG. 1, FIG. 2, and FIG. 3. However, the method is not limited to those example embodiments.

In FIG. 4, an attempt is made to match an IC pattern with the target IC layout 125. The IC pattern has N layers (i.e., N≥1), and an attempt is made to match the N layers of the IC pattern with a corresponding N layers of the target IC layout 125. As discussed above, multiple pattern anchors may be associated with a single layer of an IC pattern, and each of these multiple pattern anchors is of a different anchor type and has a different match time estimate. In the process depicted in FIG. 4, the match time estimate associated with a pattern anchor in a layer of the IC pattern is revised based on a corresponding layer of the target IC layout 125, resulting in a revised match time estimate. Then, the pattern anchor associated with the shortest revised match time estimate is used to search for the IC pattern in the target IC layout 125.

At 405, all the match time estimates for the IC pattern are received. Each match time estimate is associated with an anchor type, a layer of the IC pattern, and a pattern anchor in the layer. For example, match time estimate T(Q, j) is the match time estimate associated with anchor type Q and layer j of the IC pattern. Further, a pattern anchor in layer j is associated with T(Q, j). If the IC pattern only has one layer (e.g., N=1), the j index may be omitted. The match time estimate may be calculated by the process shown in FIG. 3. One or more match time estimates may be obtained from the IC pattern library 105.

At 410, each match time estimate is revised. Match time estimate T(Q, j) is revised by scaling the match time estimate by a ratio. The numerator of the ratio may equal an estimated number of target anchors of anchor type Q in the layer of the target IC layout 125 corresponding to layer j of the IC pattern (discussed below). The denominator of the ratio may equal the number of candidate anchors of anchor type Q in layer j of the IC pattern (e.g., as determined at 315 of FIG. 3).

The process for estimating the number of target anchors in a layer of the target IC layout 125 (i.e., the numerator of the ratio) depends on the anchor type. For example, when the anchor type is vertex, 90° concave vertex, or convex vertex, the estimated number of target anchors in the layer of the target IC layout 125 (i.e., the numerator of the ratio) is a count of the number polygons in the layer, a count of the number of trapezoids in the layer, or a sum of the count of the number of polygons and the count of the number of trapezoids in the layer.

As another example, when the anchor type is rectangle shape, enclosing, non-rectangle shape, or line end shape, the estimated number of target anchors in the layer of the target IC layout 125 (i.e., the numerator of the ratio) is a count of the number of polygons of the anchor type (e.g., rectangle shape, non-rectangle shape, etc.) in the layer that also satisfy the one or more dimension parameters of the anchor type.

As yet another example, when the anchor type is 45° vertex or 45° concave vertex, the estimated number of target anchors in the layer of the target IC layout 125 (i.e., the numerator of the ratio) is determined by identifying each non-orthogonal polygon in the layer of the target IC layout 125, doubling the trapezoid number of the non-orthogonal polygon, and summing these values (i.e., summing the doubled trapezoid numbers of all non-orthogonal polygons).

At 415, all the revised match time estimates are compared to determine the shortest revised match time estimate. For the remainder of this process, it is assumed that revised T(M, k) is the shortest revised match time estimate of all revised match time estimates.

At 420, target anchors of the anchor type M are generated for the layer of the target IC layout 125 that corresponds to layer k of the IC pattern. Target anchors may be generated by anchor generator 110. Unlike at 410, where the number of target anchors were estimated, at 425, target anchors of the anchor type M are actually generated for the layer of the target IC layout. If anchor type M has one or more dimension parameters, target anchor generation is regulated by the dimension parameters (discussed above in reference to FIG. 2).

At 425, the target IC layout is searched for the IC pattern using the pattern anchor associated with T(M, k) and the generated target anchors. The searching may include aligning the pattern anchor associated with T(M, k) in the IC pattern with a target anchor of the layer of the target IC layout, and then comparing the region surrounding the target anchor in the target IC layout with the rest of the IC pattern surrounding the pattern anchor. The searching may also include rotating the IC pattern about the pattern anchor for each target anchor. This may be repeated for each target anchor in the target IC layout. Additional details regarding the searching are discussed in reference to FIG. 5.

At 435, a hotspot in the target IC layout 125 is detected due to a match. As discussed above, each IC pattern may correspond to an undesirable pattern (e.g., patterns in which one or more constraints are not satisfied, such as manufacturing constraints, DRC constraints, electrical constraints, lithographic constraints, etc.). Accordingly, if the IC pattern is found in target IC layout 125, this portion of target IC layout 125 may be reported as a hotspot for further evaluation and possible correction or redesign. Additionally or alternatively, an IC pattern may correspond to an acceptable pattern. Accordingly, if a validation report identifies an area of the target IC layout 125 that matches the IC pattern, this portion of the validation report may be waived (i.e., the identified area may be deemed as satisfying the manufacturing constraints).

Those skilled in the art, having the benefit of this detailed description, will appreciate that the process depicted in FIG. 4 may be repeated for each IC pattern in the IC pattern library 105.

Further, those skilled in the art, having the benefit of this detailed description, will appreciate that target IC layout 125 may have additional sets of N layers. Accordingly, the process depicted in FIG. 4 may be repeated for each additional set of N layers.

Figure 5:
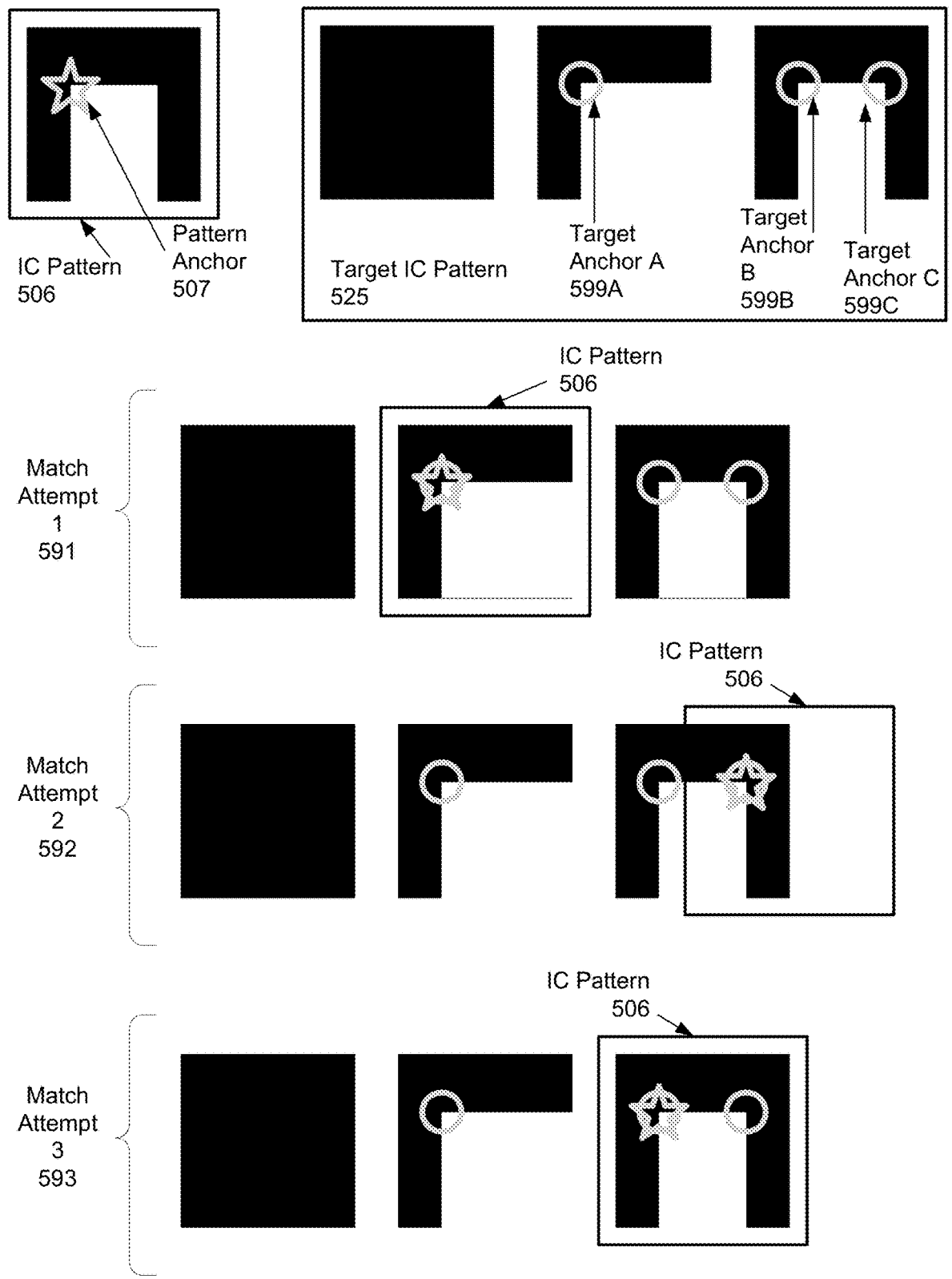
FIG. 5 depicts an example for IC pattern matching using anchors in accordance with one or more embodiments.

FIG. 5 shows an example of IC pattern matching using anchors in accordance with one or more embodiments. As shown in FIG. 5, there exists an IC pattern 506 with a pattern anchor 507. IC pattern 506 and pattern anchor 507 may correspond to IC pattern 1 106A and anchor Y 107Y, respectively, discussed above in reference to FIG. 1. As also shown in FIG. 5, there exists a target IC layout 525. Target IC layout 525 may correspond to target IC layout 125, also discussed above in reference to FIG. 1. The target IC layout 525 has three target anchors: target anchor A 599A, target anchor B 599B, and target anchor C 599C. The anchor 506 and the target anchors 599 all belong to the same anchor type. Finding IC pattern 506 in target IC layout 525 requires visiting each target anchor, aligning the pattern anchor 507 with the current target anchor, clipping the target IC layout 525 around the current target anchor based on the size of the IC pattern 506, and then comparing the region surrounding the target anchor in the clipped portion with the rest of IC pattern 506 surrounding pattern anchor 507.

In match attempt 1 591, target anchor A 599A is visited. In match attempt 1 591, pattern anchor 507 is aligned with target anchor A 599A, and target IC layout 525 is clipped around target anchor A 599A based on the size of IC pattern 506. Then, the region surrounding target anchor A 599A in the clipped portion is compared with the rest of IC pattern 506 surrounding pattern anchor 507. There is not a good match.

In match attempt 2 592, target anchor C 599C is visited. In match attempt 2 592, pattern anchor 507 is aligned with target anchor C 599C, and target IC layout 525 is clipped around target anchor C 599C based on the size of IC pattern 506. Then, the region surrounding target anchor C 599C in the clipped portion is compared with the rest of IC pattern 506 surrounding pattern anchor 507. There is not a good match.

In match attempt 3 593, target anchor B 599B is visited. In match attempt 2 592, pattern anchor 507 is aligned with target anchor B 599B, and target IC layout 525 is clipped around target anchor B 599B based on the size of IC pattern 506. Then, the region surrounding target anchor B 599B in the clipped portion is compared with the rest of IC pattern 506 surrounding pattern anchor 507. This is a good match. This clipped portion of target IC layout 525 may be reported as a hotspot in a verification report for possible correction or redesign.

Figure 6:
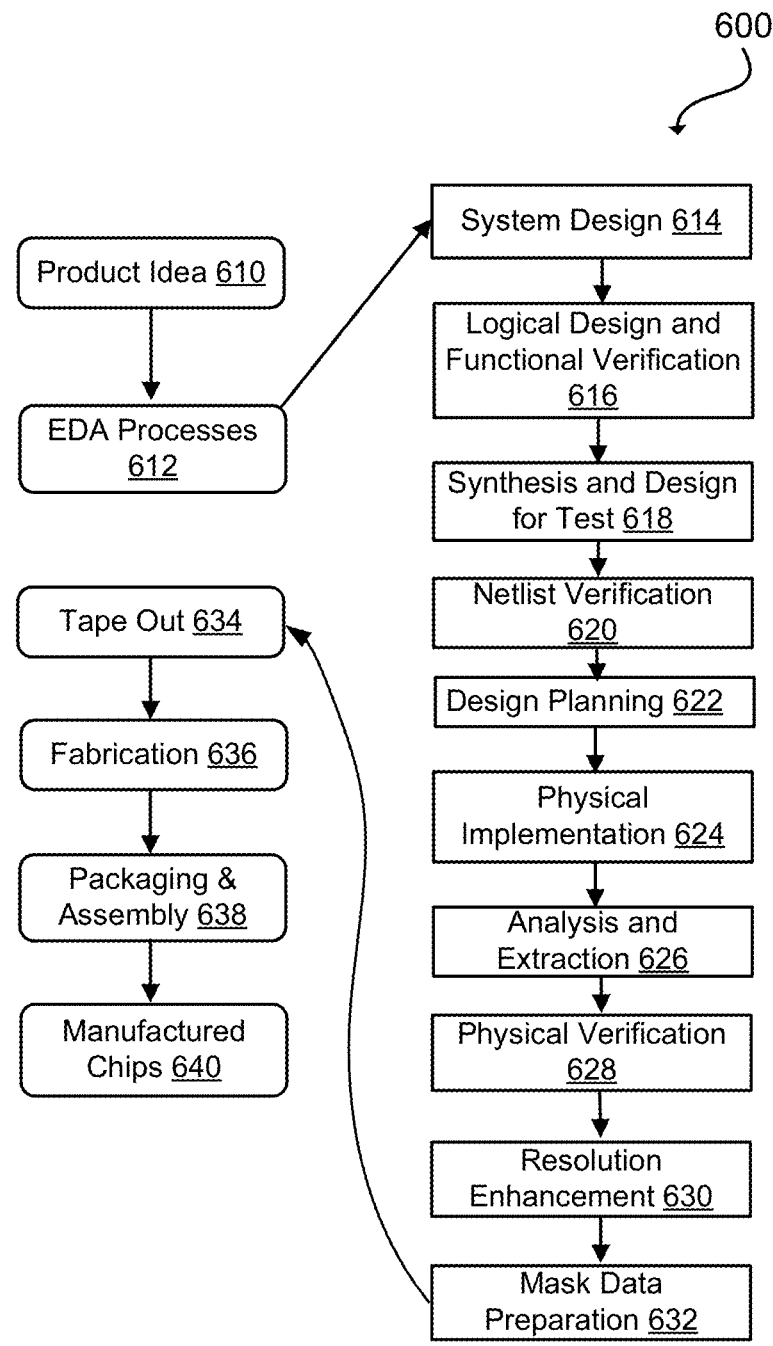
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 438 are performed to produce the finished integrated circuit 640.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

Figure 7:
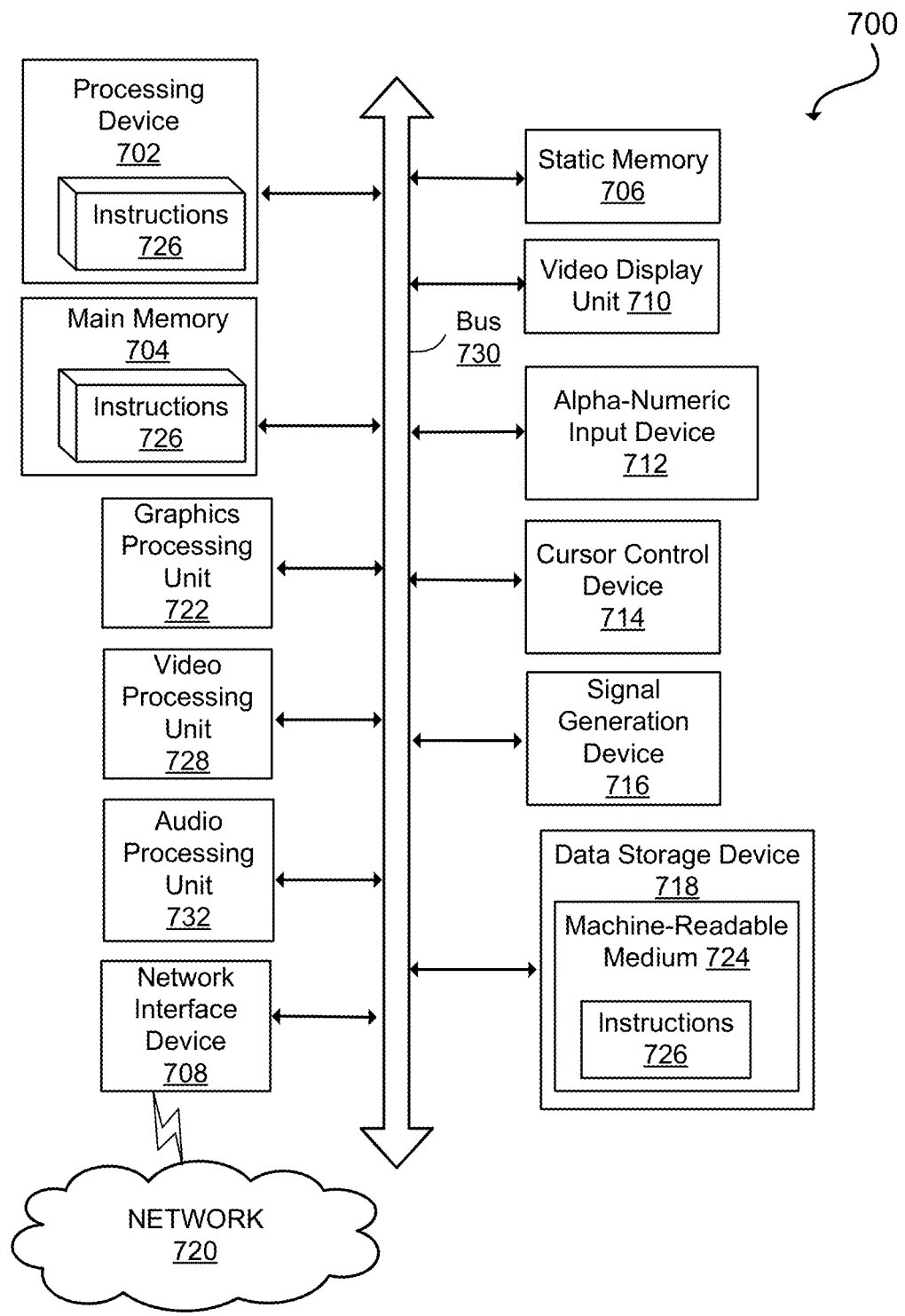
FIG. 7 depicts an abstract diagram of an example computer system in which embodiments of the present disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   receiving, by one or more processors, a first match time estimate associated with a first pattern anchor of a first anchor type of a plurality of anchor types within an integrated circuit (IC) pattern;
   receiving, by the one or more processors, a second match time estimate associated with a second pattern anchor of a second anchor type of the plurality of anchor types within the IC pattern;
   determining whether the first match time estimate is shorter than the second time estimate;
   in response to determining that the first match time estimate is shorter than the second time estimate, generating, by the one or more processors, a plurality of target anchors of the first anchor type within a layer of a target IC layout; and
   searching, by the one or more processors, the target IC layout for the IC pattern using the first pattern anchor and the plurality of target anchors.

2. The method of claim 1, wherein the first anchor type is associated with a dimension parameter.

3. The method of claim 1, further comprising:
   generating a plurality of candidate anchors of the first anchor type for the IC pattern;
   determining a plurality of distances between a center of the IC pattern and the plurality of candidate anchors; and
   selecting the first pattern anchor from the plurality of candidate anchors based on a distance between the center of the IC pattern and the first pattern anchor.

4. The method of claim 1, further comprising:
   calculating the first match time estimate based on an anchor generation time for the first anchor type, a number of candidate anchors of the first anchor type in the IC pattern, and an average match time.

5. The method of claim 1, further comprising:
   generating an estimate of a number of target anchors of the first anchor type in the layer of the target IC layout;
   calculating a ratio of the estimate to a number of candidate anchors of the first anchor type in the IC pattern;
   revising the first match time estimate by scaling the first match time estimate based on the ratio; and
   revising the second match time estimate.

6. The method of claim 5, wherein the plurality of anchor types includes a vertex or a 90° concave vertex, and wherein generating the estimate comprises counting a number of polygons in the layer.

7. The method of claim 5, wherein the plurality of anchor types includes a rectangle shape, an enclosing, a non-rectangular shape, or a line end shape, and wherein generating the estimate comprises counting a number of polygons in the layer of the first anchor type.

8. The method of claim 5, wherein the plurality of anchor types includes a 45° vertex or a 45° concave vertex, and wherein generating the estimate comprises identifying non-orthogonal polygons in the layer and doubling the trapezoid number of the non-orthogonal polygons.

9. The method of claim 1, further comprising:
   detecting a process hotspot based on searching the layer of the target IC layout.

10. A system, comprising:
    a memory; and
    a processor operatively connected to the memory and configured to:
    receive a first match time estimate associated with a first pattern anchor of a first anchor type of a plurality of anchor types within an integrated circuit (IC) pattern;
    receive a second match time estimate associated with a second pattern anchor of a second anchor type of the plurality of anchor types within the IC pattern;
    determine whether the first match time estimate is shorter than the second match time estimate;
    in response to the first match time estimate being shorter than the second match time estimate, generate a plurality of target anchors of the first anchor type within a layer of a target IC layout; and
    search the target IC layout for the IC pattern using the first pattern anchor and the plurality of target anchors.

11. The system of claim 10, wherein the first anchor type is associated with a dimension parameter.

12. The system of claim 10, wherein the processor is further configured to:
    generate an estimate of a number of target anchors of the first anchor type in the layer of the target IC layout;
    calculate a ratio of the estimate to a number of candidate anchors of the first anchor type in the IC pattern;
    revise the first match time estimate by scaling the first match time estimate based on the ratio; and
    revise the second match time estimate.

13. The system of claim 12, wherein the plurality of anchor types includes a vertex or a 90° concave vertex, and wherein the estimate is generated by at least counting a number of polygons in the layer.

14. The system of claim 12, wherein the plurality of anchor types includes a rectangle shape, an enclosing, a non-rectangular shape, or a line end shape, and wherein the estimate is generated by at least counting a number of polygons in the layer of the first anchor type.

15. The system of claim 12, wherein the plurality of anchor types includes a 45° vertex or a 45° concave vertex, and wherein the estimate is generated by at least identifying non-orthogonal polygons in the layer and doubling the trapezoid number of the non-orthogonal polygons.

16. A non-transitory computer readable medium comprising stored instructions, which when executed by a processor, cause the processor to:
    receive a first match time estimate associated with a first pattern anchor of a first anchor type of a plurality of anchor types within an integrated circuit (IC) pattern;
    receive generate a second revised match time estimate associated with a second pattern anchor of a second anchor type of the plurality of anchor types within the IC pattern;
    determine whether the first match time estimate is shorter than the second match time estimate;
    in response to the first match time estimate being shorter than the second match time estimate, generate a plurality of target anchors of the first anchor type within a layer of a target IC layout; and
    search the target IC layout for the IC pattern using the first pattern anchor and the plurality of target anchors.

17. The non-transitory computer readable medium of claim 16, wherein the instructions, when executed by the processor, further cause the processor to:
    generate an estimate of a number of target anchors of the first anchor type in the layer of the target IC layout;
    calculate a ratio of the estimate to a number of candidate anchors of the first anchor type in the IC pattern;
    revise the first match time by scaling the first match time estimate based on the ratio; and
    revise the second match time.

18. The non-transitory computer readable medium of claim 17, wherein the plurality of anchor types includes a vertex or a 90° concave vertex, and wherein the estimate is generated by at least counting a number of polygons in the layer.

19. The non-transitory computer readable medium of claim 17, wherein the plurality of anchor types includes a rectangle shape, an enclosing, a non-rectangular shape, or a line end shape, and wherein the estimate is generated by at least counting a number of polygons in the layer of the first anchor type.

20. The non-transitory computer readable medium of claim 17, wherein the plurality of anchor types includes a 45° vertex or a 45° concave vertex, and wherein the estimate is generated by at least identifying non-orthogonal polygons in the layer and doubling the trapezoid number of the non-orthogonal polygons.

* * * * *